United States Patent
Ott et al.

(10) Patent No.: US 10,633,250 B2
(45) Date of Patent: Apr. 28, 2020

(54) PROCESS AND APPARATUS FOR PRODUCING A MIXED FEED STREAM FOR A STEAM REFORMING PLANT

(71) Applicant: L'Air Liquide, Societe Anonyme pour l'Etude et l'Exploitation des Procedes Georges Claude, Paris (FR)

(72) Inventors: Jorg Ott, Frankfurt (DE); Maik Lehmann, Frankfurt am Main (DE); Sebastian Nieding, Frankfurt am Main (DE); Christian Szieleit, Bad Nauheim (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/085,109

(22) PCT Filed: Mar. 6, 2017

(86) PCT No.: PCT/EP2017/025037
§ 371 (c)(1),
(2) Date: Sep. 14, 2018

(87) PCT Pub. No.: WO2017/157531
PCT Pub. Date: Sep. 21, 2017

(65) Prior Publication Data
US 2019/0077660 A1    Mar. 14, 2019

(30) Foreign Application Priority Data
Mar. 16, 2016  (EP) .................................... 16400005

(51) Int. Cl.
*C01B 3/38* (2006.01)
*C10G 45/32* (2006.01)
(Continued)

(52) U.S. Cl.
CPC ................. *C01B 3/38* (2013.01); *C10G 25/00* (2013.01); *C10G 45/00* (2013.01); *C10G 45/02* (2013.01);
(Continued)

(58) Field of Classification Search
None
See application file for complete search history.

(56) References Cited

U.S. PATENT DOCUMENTS

| 3,477,832 A | 11/1969 | Mayland et al. |
| 7,037,485 B1 | 5/2006 | Drnevich et al. |
| 2006/0096893 A1* | 5/2006 | De Almeida .......... C10G 45/02 208/210 |
| 2007/0267326 A1* | 11/2007 | De Almeida .......... C10G 45/08 208/210 |

(Continued)

FOREIGN PATENT DOCUMENTS
WO    WO 2011/016981    2/2011

OTHER PUBLICATIONS

International Search Report and Written Opinion for PCT/EP2017/025037, dated Jun. 14, 2017.
(Continued)

*Primary Examiner* — Tam M Nguyen
(74) *Attorney, Agent, or Firm* — Justin K. Murray

(57) ABSTRACT

This invention relates to a process and an apparatus for producing a mixed feed stream for a steam reforming plant from a first feed stream containing methane and a second feed stream comprising higher hydrocarbons, olefins and diolefins. According to the invention, the required hydrogenation of the mono- and diolefins and the hydrodesulfurization of the organic sulfur compounds contained in the feed stream are carried out step by step under process conditions optimized in each case. Furthermore, the inlet temperature into the respective reaction zone is controlled such that overheating of the feedstocks is avoided, which otherwise leads to undesired coke deposits, cloggings and the accelerated deactivation of the catalysts used.

8 Claims, 3 Drawing Sheets

(51) Int. Cl.
*C10G 45/02* (2006.01)
*C10G 70/02* (2006.01)
*C10G 70/04* (2006.01)
*C10G 25/00* (2006.01)
*C10G 67/06* (2006.01)
*C10G 45/00* (2006.01)

(52) U.S. Cl.
CPC ............ *C10G 45/32* (2013.01); *C10G 67/06* (2013.01); *C10G 70/02* (2013.01); *C10G 70/046* (2013.01); *C01B 2203/0227* (2013.01); *C01B 2203/0233* (2013.01); *C01B 2203/127* (2013.01); *C01B 2203/1264* (2013.01)

(56) References Cited

U.S. PATENT DOCUMENTS

| | | |
|---|---|---|
| 2011/0034745 A1 | 2/2011 | Raybold et al. |
| 2015/0232395 A1* | 8/2015 | Nyce ................... C10G 9/00 518/705 |

OTHER PUBLICATIONS

Spath, Pamela L., et al., "Life Cycle Assessment of Hydrogen Production via Natural Gas Steam Reforming," National Renewable Energy Laboratory Technical Report, NREL/TP-570-27637, Feb. 2001, Figure 1, p. 4.

* cited by examiner

PROCESS AND APPARATUS FOR PRODUCING A MIXED FEED STREAM FOR A STEAM REFORMING PLANT

CROSS REFERENCE TO RELATED APPLICATIONS

This application is a § 371 of International PCT Application PCT/EP2017/025037, filed Mar. 6, 2017, which claims the benefit of EP16400005.1, filed Mar. 16, 2016, both of which are herein incorporated by reference in their entireties.

FIELD OF THE INVENTION

The present invention relates to a process for producing a mixed feed stream for a steam reforming plant which contains at least one reforming stage. The mixed feed stream comprises a first feed stream containing methane and a second feed stream comprising higher hydrocarbons, olefins and diolefins, wherein the first and/or the second feed stream also contains organic sulfur compounds. As first feed stream natural gas can be used, and as second feed stream for example a refinery waste gas. The second feed stream also can contain methane, hydrogen as well as metals and chlorides.

Furthermore, the invention also relates to an apparatus for carrying out such process.

BACKGROUND

Hydrocarbons can catalytically be converted to synthesis gas, i.e. mixtures of hydrogen ($H_2$) and carbon monoxide (CO), by using steam. As is explained in Ullmann's Encyclopedia of Industrial Chemistry, Sixth Edition, 1998 Electronic Release, keyword "Gas Production", this so-called steam reforming is the most frequently used method for the production of synthesis gas, which subsequently can be converted to further important basic chemicals such as methanol or ammonia.

Steam reforming of natural gas proceeds strongly endothermally. It is therefore carried out in a reformer furnace in which numerous catalyst-containing reformer tubes are arranged in parallel, in which the steam reforming reaction takes place. The reformer tubes mostly are fired by means of burners, which are mounted on the upper side or underside or on the side walls in the interior space of the reformer furnace and directly fire the space between the reformer tubes.

After preheating by heat exchangers or fired heaters the hydrocarbon-steam mixture enters into the reformer tubes after final heating and is converted there at the reforming catalyst to obtain carbon monoxide and hydrogen. The composition of the product gas is determined by the reaction equilibrium; beside carbon monoxide and hydrogen, the product gas therefore also contains carbon dioxide, non-converted methane and steam.

For energy optimization and/or in feedstocks with higher hydrocarbons, a so-called prereformer after the preheater can be used for pre-cracking the feedstock. In a further heater, the pre-cracked feedstock then is heated to the desired inlet temperature into the main reformer, for example the steam reformer. Conventional prereforming can be defined as steam reforming process at limited temperatures (distinctly below 700° C.). It leads to a gaseous intermediate product whose main constituents are methane and steam. The intermediate product contains no or only small amounts of higher hydrocarbons. This intermediate product normally is treated further in a steam reformer referred to as main reformer.

As is explained in Ullmann's Encyclopedia of Industrial Chemistry, loc. cit., nickel-based catalysts normally are used for steam reforming. The same are sensitive to catalyst poisons such as sulfur, arsenic, copper, vanadium, lead and chlorine or halogens in general. Sulfur in particular distinctly lowers the catalyst activity and can virtually be found in all feedstocks which are suitable as feed for the steam reformation. Earlier desulfurizing systems were operated with impregnated activated carbon as adsorbent and at ambient temperature. The efficiency of this adsorption method, however, differs in dependence on the specific sulfur compounds in the feed gas stream. For this reason, desulfurizing systems now are preferred in which the removal of sulfur compounds is effected on zinc oxide as sorbent at temperatures of 350 to 400° C. These desulfurizing systems based on zinc oxide are very reliable in the absorption of hydrogen sulfide and, with limitations, sulfur compounds such as carbonyl sulfide and mercaptans. The removal of cyclic organic sulfur compounds, such as e.g. thiophenes, on the other hand normally requires a hydrogenation on cobalt-molybdenum or nickel-molybdenum catalysts with hydrogen or a hydrogen-containing gas at temperatures of typically 350 to 380° C. Reference here is also made to hydrogenating desulfurization or hydrodesulfurization (HDS). The cyclic sulfur compounds are hydrogenated to hydrogen sulfide which then is bound in a downstream fixed zinc oxide bed. This hydrogenation at the same time can be used to hydrogenate unsaturated hydrocarbons, for example olefins or diolefins, in the feed gas. Because the temperature range for this hydrogenation usually is limited to 250 to 400° C., the content of unsaturated compounds in the feed gas must be limited, as their hydrogenation proceeds strongly exothermally.

For steam reforming the use of methane-containing natural gas as feedstock or so-called feed is dominant; but, depending on local availability, there are also used other hydrocarbons, such as naphtha, liquefied gas or refinery gases. The U.S. patent specification U.S. Pat. No. 3,477,832 for example describes a process for producing a synthesis gas by catalytic steam reforming of naphtha and similar hydrocarbons. Naphtha in the sense of this application is understood to be hydrocarbons with a mean carbon number of seven, which contain straight and branched hydrocarbons, a certain amount of aromatic and olefinic hydrocarbons, and various impurities, for example sulfur components. In order to transfer this substance mixture liquid at ambient conditions into a feed stream for steam reforming, it is evaporated and heated, wherein the temperature ideally should lie between 260 and 316° C., but by no means should exceed 343° C., as otherwise a decomposition of components contained in the feed will occur by forming undesired carbon deposits in the steam reforming plant and in upstream plant components.

The International Patent Application WO 2011/016981 A2 discloses a process for producing a mixed feed stream for a steam reforming plant, wherein refinery gases, for example FCC waste gas or coker waste gas, serve as a basis, to which gases a natural gas stream is admixed. Beside olefins, both refinery gases also contain diolefins such as 1,3-butadiene. It is taught that the olefin content and the content of such streams in organic sulfur compounds requires a pretreatment, in order to avoid the deposition of carbon on the reforming catalyst or the poisoning of the catalyst with sulfur compounds which otherwise might lead to a deactivation of such catalyst.

The U.S. patent specification U.S. Pat. No. 7,037,485 B1 also teaches the formation of a mixed feed for steam reforming, comprising a natural gas stream and a refinery gas stream. The two feed streams initially are combined and mixed and subsequently heated by indirect heat exchange against the hot product stream from the CO conversion plant downstream of the steam reforming plant. Subsequently, the heated mixed stream is treated in a reactor which contains a catalyst active both for the hydrogenation of the olefins and the sulfur compounds and for the partial autothermal reformation (ATR). Steam used as temperature moderator and optionally oxygen is added to the reactor when the reactor is to be operated in the partial ATR mode, wherein pre-reforming of the higher hydrocarbons to methane and synthesis gas constituents already is effected. What is disadvantageous is the logistics needed for supplying steam and oxygen. Too much addition of steam also can lower the temperature in the reactor too much and thus negatively influence pre-reforming. Furthermore, the downstream sulfur separation then is impaired as well.

U.S. Pat. No. 7,037,485 B1 furthermore teaches two embodiments of the process, in which the natural gas stream and the refinery gas stream are pretreated completely separately and are combined only before introduction into the steam reforming unit. It is very disadvantageous that all pretreatment devices accordingly must be present twice.

SUMMARY OF THE INVENTION

Certain embodiments of the present invention indicate a process and an apparatus for producing a mixed feed stream for a steam reforming plant, which can do without the described disadvantages of the prior art.

This is solved by a process and by an apparatus with the features as described herein.

Process According to an Embodiment of the Invention

A process for producing a mixed feed stream for a steam reforming plant containing at least one reforming stage, comprising a first feed stream containing methane and a second feed stream comprising higher hydrocarbons, olefins and diolefins, wherein the first and/or the second feed stream also contains sulfur compounds, and wherein the process comprises the following steps:
(a) providing the first feed stream and the second feed stream,
(b) heating the first feed stream in a first heating device,
(c) combining and mixing at least a part of the first feed stream with the second feed stream, introducing this mixture into a first hydrogenation zone, at least partly converting the diolefins in the first hydrogenation zone under diolefin hydrogenation conditions, discharging a diolefin hydrogenation product stream from the first hydrogenation zone,
(d) introducing the diolefin hydrogenation product stream into a second hydrogenation zone, at least partly converting the olefins in the second hydrogenation zone under olefin hydrogenation conditions, discharging an olefin hydrogenation product stream from the second hydrogenation zone,
(e) introducing the olefin hydrogenation product stream into a third hydrogenation zone, at least partly converting the sulfur compounds in the third hydrogenation zone under hydrodesulfurization (HDS) conditions to desulfurized hydrocarbons and hydrogen sulfide, discharging an HDS product stream from the third hydrogenation zone,
(f) introducing the HDS product stream into at least one adsorption zone, filled with an adsorbent selective for hydrogen sulfide, at least partly separating the hydrogen sulfide by adsorption on the adsorbent, discharging an adsorber product stream depleted of hydrogen sulfide from the adsorption zone,
(g) introducing the adsorber product stream as mixed feed stream into at least one reforming stage.

Apparatus According to an Embodiment of the Invention

An apparatus for producing a mixed feed stream for a steam reforming plant containing at least one reforming stage, comprising a first feed stream containing methane and a second feed stream comprising higher hydrocarbons, olefins and diolefins, wherein the first and/or the second feed stream also contains sulfur compounds, and wherein the apparatus comprises the following components which are in fluid connection with each other:
(a) means for providing the first feed stream and the second feed stream,
(b) a first heating device for heating the first feed stream,
(c) means for combining and mixing at least a part of the first feed stream with the second feed stream, a first hydrogenation zone, means for introducing this mixture into the first hydrogenation zone, means for discharging a diolefin hydrogenation product stream from the first hydrogenation zone,
(d) a second hydrogenation zone, means for introducing the diolefin hydrogenation product stream into the second hydrogenation zone, means for discharging an olefin hydrogenation product stream from the second hydrogenation zone,
(e) a third hydrogenation zone (HDS), means for introducing the olefin hydrogenation product stream into the third hydrogenation zone, means for discharging an HDS product stream from the third hydrogenation zone,
(f) an adsorption zone, filled with an adsorbent selective for hydrogen sulfide, means for introducing the HDS product stream into the at least one adsorption zone, means for discharging an adsorber product stream depleted of hydrogen sulfide from the adsorption zone,
(g) at least one reforming stage, means for introducing the adsorber product stream as mixed feed stream into the at least one reforming stage.

Fluid connection between two regions of the apparatus according to the invention is understood to be any kind of connection which enables a fluid, for example a gas stream, to flow from the one to the other of the two regions, regardless of any interposed regions or components.

Higher hydrocarbons in the sense of the invention are understood to be all hydrocarbons with more than one C atom in the molecule.

The conversion conditions required for the conversion of the diolefins in the first hydrogenation zone, for the conversion of the olefins in the second hydrogenation zone and for the conversion of the sulfur compounds in the third hydrogenation zone are known to the skilled person from the prior art, for example from the documents discussed above. Necessary adaptations of these conditions to the respective operating requirements will be made on the basis of routine experiments.

According to the invention, the required hydrogenation of the mono- and diolefins and the hydrodesulfurization of the organic sulfur compounds contained in the feed stream are carried out step by step under process conditions optimized in each case. Furthermore, the inlet temperature into the respective reaction zone is controlled such that overheating of the feedstocks is avoided, which otherwise leads to undesired coke deposits, cloggings and the accelerated deactivation of the catalysts used.

Since there are catalysts which enable the hydrogenation of olefins and the hydrodesulfurization of organic sulfur compounds under the same or similar process conditions, the invention in the case of the use of such catalysts is to be understood such that the second and third hydrogenation zones coincide.

The second feed stream also can contain methane, hydrogen as well as metals and chlorides. This frequently is the case when a refinery waste gas is used as second feed stream.

When carrying out the process according to the invention, hydrogen is added to one or both of the feed streams, unless sufficient hydrogen is present already in one of the feed streams. For this purpose, a measurement of the hydrogen content is made by sampling and analysis of the feed streams, possibly online; if necessary, the stoichiometric need of hydrogen for the hydrogenation steps is completed by recirculation of a hydrogen recycle stream from the hydrogen product stream of the steam reforming plant. In the apparatus according to the invention corresponding measurement points or sampling points as well as a return conduit for the recirculation of hydrogen from the steam reforming product therefore must be provided.

Preferred Aspects of the Invention

In a preferred aspect of the process according to the invention combining and mixing of at least a part of the first feed stream with the second feed stream is effected such that on entry into the first hydrogenation zone the mixture has a temperature of less than 300° C., preferably less than 250° C., most preferably less than 230° C. In this way, undesired cracking and polymerization reactors of the olefins contained in the mixture, in particular of the diolefins, are safely avoided. In these undesired reactions coke is formed, which is deposited within the pipe conduits and apparatuses and blocks the same mechanically, so that the pressure loss rises and the heat-exchange efficiency of heat exchangers is impaired. The deposition of coke on or in the used fixed catalyst beds leads to their deactivation. For removing the coke deposits the steam reforming plant must be shut down, which results in shut-down periods and production losses.

A further preferred aspect of the process according to the invention is characterized in that
- after heating in the first heating device, the first feed stream is split up into a first hydrogenation partial stream and a second hydrogenation partial stream,
- the first hydrogenation partial stream is introduced into a cooling device,
- a cooled first hydrogenation partial stream is discharged from the cooling device,
- the cooled first hydrogenation partial stream is combined and mixed with the second feed stream,
- the mixture thus obtained is introduced into the first hydrogenation zone.

It is very advantageous that the second feed stream, which contains the olefins and diolefins, is added to the cooled first hydrogenation partial stream and thus is introduced into the process at a relatively cold point. This measure also is very helpful to avoid undesired cracking and polymerization reactions of the olefins and diolefins contained in the mixture. It is particularly advantageous that the second feed stream, which contains the olefins and diolefins, no longer gets in contact with heat-exchange surfaces of heat exchangers prior to the conversion of the diolefins in the first hydrogenation zone. As due to heat transfer limitations said heat exchange surfaces always must be hotter than the desired exit temperature of the fluid stream from the heat exchanger, an increased decomposition of unsaturated hydrocarbons to coke occurs at such heat-exchange surfaces.

In a development of the above aspect of the process according to the invention the diolefin hydrogenation product stream is combined and mixed with the second hydrogenation partial stream and the mixture thus obtained is introduced into the second hydrogenation zone. In this way, all olefins are supplied to the hydrogenation in the second hydrogenation zone. Due to the fact that the diolefins in the second feed stream have first been pre-hydrogenated in the first hydrogenation zone, the reaction conditions in the second hydrogenation zone can be optimized with regard to the hydrogenation of the monoolefins. Furthermore, the exothermicity in the second hydrogenation zone is reduced.

In a further development of the two above aspects of the process according to the invention an air cooler or a heat exchanger is used as cooling device, wherein in use of a heat exchanger cooling preferably is effected by indirect heat exchange against at least a part of the first feed stream before the first heating device. Both cooling devices provide for sufficient cooling of the first hydrogenation partial stream prior to addition of the second feed stream. In use of a heat exchanger the enthalpy of the first hydrogenation partial stream also is utilized for heating another fluid stream, preferably the cold first feed stream.

In the above aspects of the process according to the invention it is preferred particularly when the cooling capacity of the cooling device and/or the quantity ratio of the first hydrogenation partial stream to the second hydrogenation partial stream is chosen such that on entry into the first hydrogenation zone the mixture has a temperature of less than 300° C., preferably less than 250° C., most preferably less than 230° C. The desired inlet temperature of the mixture into the first hydrogenation zone accordingly can be set by either controlling the cooling capacity of the cooling device or alternatively by varying the quantity ratio of the first hydrogenation partial stream to the second hydrogenation partial stream by corresponding quantity and flow control. A combination of both measures also is possible. This results in additional degrees of freedom and a large flexibility when setting the desired inlet temperature into the first hydrogenation zone.

In a particular aspect of the process according to the invention the second feed stream is introduced into an adsorption zone, which is filled with an adsorbent selective for metals, before combining and mixing the same with at least a part of the first feed stream. Petroleum-based feed streams such as refinery waste gases can contain significant amounts of metals, which can act as catalyst poisons in downstream process stages and therefore must first be removed.

In a further aspect of the process according to the invention the first heating device is designed as heat exchanger, wherein the first feed stream is heated by indirect heat exchange against a hot raw synthesis gas product stream from the steam reforming plant, against a hot flue gas stream from the reformer furnace or against a hot product gas stream from the CO conversion plant (CO shift) downstream of the steam reforming plant. Due to this measure the heat content of said process streams is utilized for heating the first feed stream and thus the energy efficiency of the entire process is improved.

In a development of the process according to the invention the steam reforming plant comprises a pre-reforming stage (preformer) in which higher hydrocarbons are at least partly converted to methane under pre-reforming conditions. This development particularly advantageously cooperates with the process according to the invention for producing a mixed feed stream, as the mono- and diolefins contained in the mixed feed stream are hydrogenated to the corresponding alkanes which then can specifically be pre-converted to methane in the pre-reforming stage, before the mixed feed stream gets into the main reforming stage.

In a particular aspect of the apparatus according to the invention the same furthermore comprises means which provide for carrying out the combining and mixing of at least a part of the first feed stream with the second feed stream such that on entry into the first hydrogenation zone the mixture has a temperature of less than 300° C., preferably less than 250° C., most preferably less than 230° C. Such means in particular comprise temperature measuring and temperature control devices. In this way, undesired cracking and polymerization reactors of the olefins contained in the mixture, in particular of the diolefins, are safely avoided. In these undesired reactions coke is formed, which is deposited within the pipe conduits and apparatuses and blocks the same mechanically, so that the pressure loss rises and the heat-exchange efficiency of heat exchangers is impaired. The deposition of coke on or in the used fixed catalyst beds leads to their deactivation. For removing the coke deposits the steam reforming plant must be shut down, which results in shut-down periods and production losses.

A further preferred aspect of the apparatus according to the invention is characterized in that the same furthermore comprises:
- a separating device for splitting up the first feed stream, after heating in the first heating device, into a first hydrogenation partial stream and a second hydrogenation partial stream,
- a cooling device and means for introducing the first hydrogenation partial stream into the cooling device,
- means for discharging a cooled first hydrogenation partial stream from the cooling device,
- means for combining and mixing the cooled first hydrogenation partial stream with the second feed stream,
- means for introducing the mixture thus obtained into the first hydrogenation zone.

It is very advantageous that due to this configuration of the apparatus the second feed stream, which contains the olefins and diolefins, is added to the cooled first hydrogenation partial stream and thus is introduced into the process at a relatively cold point. This measure also is very helpful to avoid undesired cracking and polymerization reactions of the olefins and diolefins contained in the mixture. It is particularly advantageous that the second feed stream, which contains the olefins and diolefins, no longer gets in contact with heat-exchange surfaces of heat exchangers prior to the conversion of the diolefins in the first hydrogenation zone. As due to heat transfer limitations said heat exchange surfaces always must be hotter than the desired exit temperature of the fluid stream from the heat exchanger, an increased decomposition of unsaturated hydrocarbons to coke occurs on such heat-exchange surfaces.

In a development of the above configuration of the apparatus according to the invention the same furthermore comprises means for combining and mixing the diolefin hydrogenation product stream with the second hydrogenation partial stream and for introducing the obtained mixture into the second hydrogenation zone. In this way, all olefins are supplied to the hydrogenation in the second hydrogenation zone. Due to the fact that the diolefins in the second feed stream have first been pre-hydrogenated in the first hydrogenation zone, the reaction conditions in the second hydrogenation zone can be optimized with regard to the hydrogenation of the monoolefins. Furthermore, the exothermicity in the second hydrogenation zone is reduced.

In a further development of the two above configurations of the apparatus according to the invention an air cooler or a heat exchanger is used as cooling device, wherein in use of a heat exchanger cooling preferably is effected by indirect heat exchange against at least a part of the first feed stream before the first heating device. Both cooling devices provide for sufficient cooling of the first hydrogenation partial stream prior to addition of the second feed stream. In use of a heat exchanger the enthalpy of the first hydrogenation partial stream also is utilized for heating another fluid stream, preferably the cold first feed stream.

In the above configurations of the apparatus according to the invention it is preferred particularly when the cooling capacity of the cooling device can be set such and/or the quantity ratio of the first hydrogenation partial stream to the second hydrogenation partial stream can be chosen by means of at least one flow control device such that on entry into the first hydrogenation zone the mixture has a temperature of less than 300° C., preferably less than 250° C., most preferably less than 230° C. The desired inlet temperature of the mixture into the first hydrogenation zone accordingly can be set by either controlling the cooling capacity of the cooling device or alternatively by varying the quantity ratio of the first hydrogenation partial stream to the second hydrogenation partial stream by corresponding quantity and flow control. A combination of both measures also is possible. This results in additional degrees of freedom and a large flexibility when setting the desired inlet temperature into the first hydrogenation zone.

In a particular configuration of the apparatus according to the invention the same furthermore comprises an adsorption zone which is filled with an adsorbent selective for metals and which is disposed upstream of the one or more means for combining and mixing the second feed stream with at least a part of the first feed stream. Petroleum-based feed streams such as refinery waste gases can contain significant amounts of metals, which in downstream process stages can act as catalyst poisons and therefore must first be removed.

In a further aspect of the apparatus according to the invention the first heating device is designed as heat exchanger and suited to carry out an indirect heat exchange between the first feed stream and a hot raw synthesis gas product stream from the steam reforming plant, a hot flue gas stream from the reformer furnace, or a hot product gas stream from the CO conversion plant (CO shift) downstream of the steam reforming plant. Due to this configuration the heat content of said process streams is utilized for heating the first feed stream and thus the energy efficiency of the entire process is improved.

In a development of the apparatus according to the invention the steam reforming plant comprises a pre-reforming stage (preformer) in which higher hydrocarbons are at least partly converted to methane under pre-reforming conditions. This development particularly advantageously cooperates with the apparatus according to the invention for producing a mixed feed stream, as the mono- and diolefins contained in the mixed feed stream are hydrogenated to the corresponding alkanes which then can specifically be pre-converted to methane in the pre-reforming stage, before the mixed feed stream gets into the main reforming stage.

BRIEF DESCRIPTION OF THE DRAWINGS

Further features, advantages and possible applications of the invention can also be taken from the following description of exemplary embodiments and numerical examples as well as the drawings. All features described and/or illustrated form the subject-matter of the invention per se or in any combination, independent of their inclusion in the claims or their back-reference.

In the drawings.

DETAILED DESCRIPTION OF THE INVENTION

Figure 1:
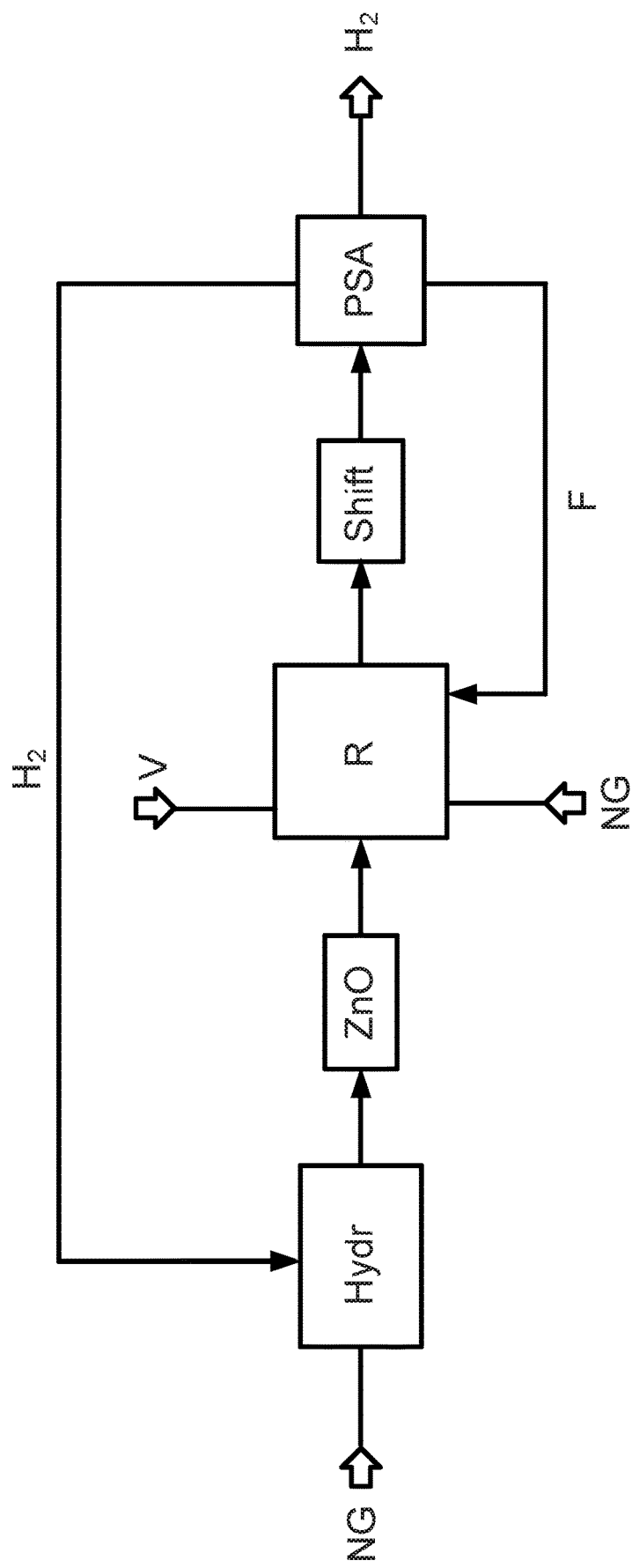
FIG. 1 shows a process for producing a natural gas feed stream and its subsequent conversion in a steam reforming plant according to the prior art.

In FIG. 1 a process for producing a natural gas feed stream and its subsequent conversion to a hydrogen-containing product gas in a stream reforming plant according to the prior art is schematically shown as block flow diagram (Life Cycle Assessment of Hydrogen Production via Natural Gas Steam Reforming, Spath, P. L., Mann, M. K., National Renewable Energy Laboratory Technical Report, NREL/TP-570-27637, February 2001, FIG. 1, page 4).

A hydrocarbonaceous feed stream, for example natural gas (NG), is guided into a hydrogenation stage (Hydr). In the same, the hydrogenation of unsaturated hydrocarbons, for example of mono- and diolefins, to the corresponding alkanes is effected, as well as the hydrodesulfurizaton (HDS) of sulfur-containing organic compounds, for example of mercaptans, to sulfur-reduced organic compounds and hydrogen sulfide ($H_2S$). The latter is adsorbed or absorbed on zinc oxide (ZnO) in the downstream sorption stage and the sulfur content thus is removed from the reformer feed. The reformer feed subsequently is introduced into the steam reforming stage (R) and in the same converted with likewise supplied steam (V) to obtain a raw synthesis gas. The raw synthesis gas subsequently is charged to a CO conversion stage (shift) in which carbon monoxide (CO) contained in the raw synthesis gas is converted to further hydrogen by using additionally supplied steam (not illustrated). The product stream of the CO conversion stage subsequently is guided into a pressure swing adsorption plant (PSA) in which it is split up into a hydrogen clean product stream and a residual gas stream (F). The residual gas stream still contains combustible components and is re-circulated to the reformer, where it serves for heating the reformer furnace together with additionally supplied natural gas. A part of the hydrogen clean product stream is recirculated to the hydrogenation stage as hydrogenating agent.

Figure 2:
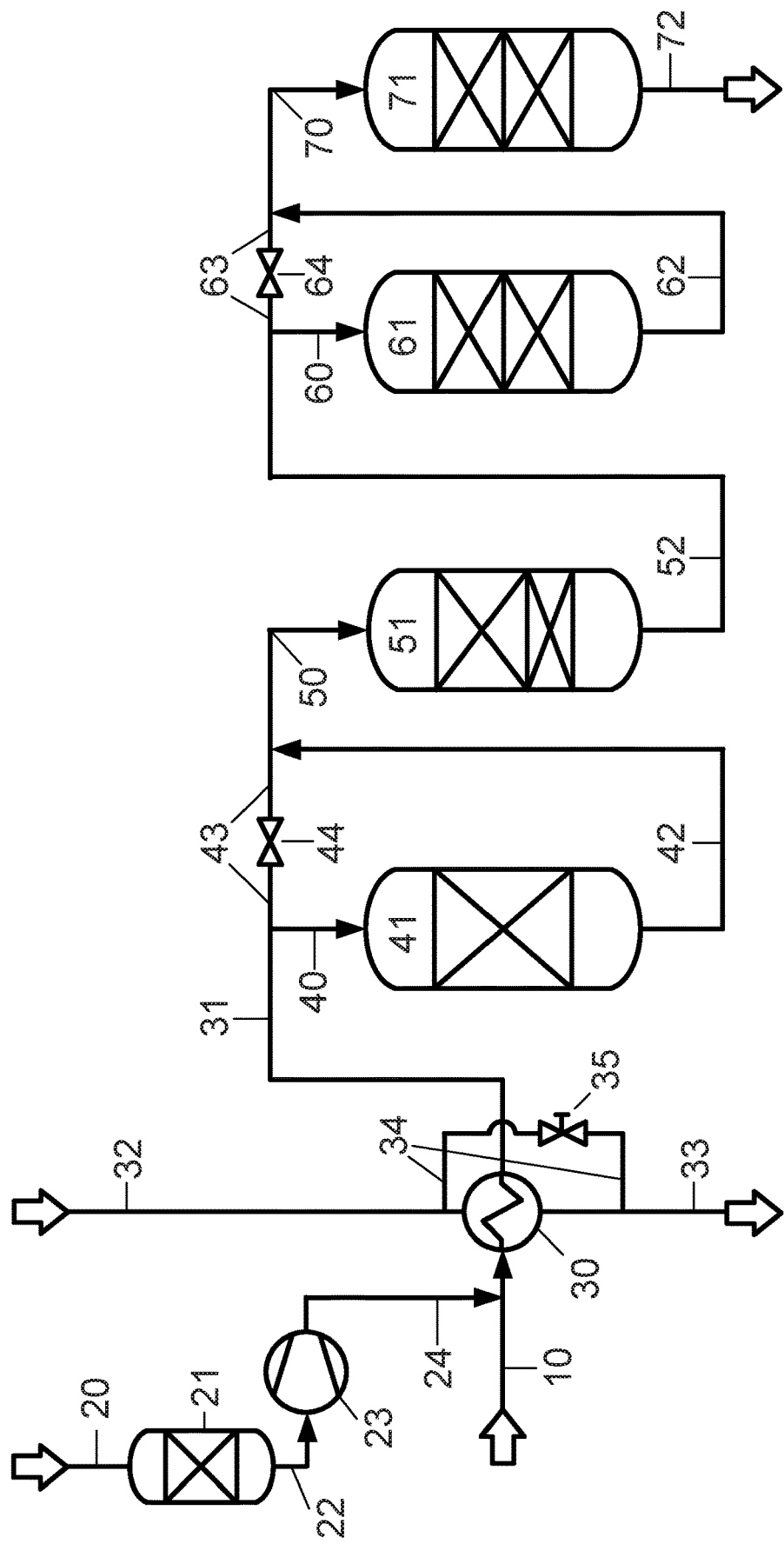
FIG. 2 shows the schematic representation of the process of the invention and the apparatus of the invention according to a first aspect.

FIG. 2 schematically shows the process of the invention and the apparatus of the invention according to a first aspect. Via conduit 10 the first feed stream, in the present case natural gas, is passed to the heat exchanger 30. Via conduit 20 a second feed stream, in the present example a refinery waste gas, is supplied to the adsorber 21 which is filled with an adsorbent selective for metals, for example activated carbon impregnated with sulfur, and thus effects a demetallization of the second feed stream. The adsorber furthermore contains an adsorbent for the deposition of chlorides.

Via conduit 22 the second feed stream depleted of metals is guided to the condenser 23, condensed there and via conduit 24 combined and mixed with the first feed stream in conduit 10. The resulting mixed feed stream is heated in the heat exchanger 30 by indirect heat exchange against the hot product gas stream from the CO conversion plant (CO shift) downstream of the steam reforming plant, which via conduit 32 is guided to the heat exchanger 30.

To limit the increase in temperature when heating the mixed feed stream in the heat exchanger 30, the same is equipped with a bypass, conduit 34 and a control valve 35 arranged in the conduit path 34. In the same way, the exothermicity of the hydrogenation of the unsaturated hydrocarbons can be taken into account and the exit temperature for example from the second hydrogenation zone can be kept constant. In an alternative configuration the conduit path 34 and the control valve 35 arranged therein also can be omitted and instead a cooling device can be integrated into the conduit path 31 (not illustrated). In a further alternative configuration, instead of the bypass of conduit 34, with which a part of the hot product gas stream from the CO conversion plant is guided around the heat exchanger 30, a bypass can be connected with which a part of the cold first feed stream, here natural gas, is guided around the heat exchanger 30 (not illustrated). Combinations of these configurations also are possible.

Via conduit 31 the heated, mixed feed stream is discharged from the heat exchanger 30 and via conduit 40 charged to the diolefin hydrogenation reactor 41 (first hydrogenation zone), which is equipped with a fixed bed of a granular, solid hydrogenation catalyst which is active and selective for the hydrogenation of olefins, in particular diolefins, and at the same time is resistant to poisoning by organic sulfur compounds. Corresponding catalysts are kept in stock by the trade. The reaction conditions in the diolefin hydrogenation reactor, in particular the kind of and the chosen inlet temperature, are chosen such that there above all the diolefins contained in the mixed feed stream, but also a smaller part of the contained monoolefins, are hydrogenated to the corresponding monoolefins or alkanes and the adiabatic increase in temperature is limited. Via conduit 42, the diolefin hydrogenation product stream is discharged from the diolefin hydrogenation reactor.

Conduit 43 branching off from conduit 40, the valve 44 arranged in the conduit path 43, and further non-illustrated shut-off devices and auxiliary conduits substantially serve the connection of a bypass around the diolefin hydrogenation reactor 41, if revision work, for example an exchange of the contained hydrogenation catalyst, must be carried out on the latter in ongoing operation. In normal operation the valve 44 remains closed.

The diolefin hydrogenation product stream depleted of diolefins, which is discharged from the diolefin hydrogenation reactor via conduit 42, is charged to the hydrogenation reactor 51 (second hydrogenation zone) via conduit 50. In the present example, the same is equipped with an upper and a lower fixed catalyst bed. The upper fixed catalyst bed, which forms the second hydrogenation zone, contains a bed of a granular, solid hydrogenation catalyst which is active and selective for the hydrogenation of olefins and at the same time is resistant to poisoning by organic sulfur compounds. The lower fixed catalyst bed forming the third hydrogenation zone on the other hand above all serves the hydrogenating desulfurization (hydrodesulfurization, HDS) of the contained organic sulfur components. Such catalysts also are known per se and commercially available; they are often based on the active components nickel-molybdenum (NiMo) or cobalt-molybdenum (CoMo).

Via conduit 52, the HDS product stream is discharged from the olefin hydrogenation reactor. It now largely only contains hydrogenated and thus saturated hydrocarbons and hydrogen sulfide. Via conduit 60 this material stream is introduced into a first adsorber 61 which in the present example contains two adsorption zones designed as fixed beds. The upper adsorption zone is equipped with a bed of a solid alumina-based adsorbent which is active for the adsorption of chlorides. The lower adsorption zone contains a bed of a solid sorbent on the basis of zinc oxide for the removal of hydrogen sulfide. Both sorbents are known per se and commercially available.

Via conduit 62 a first adsorber product stream depleted of hydrogen sulfide and chlorides is discharged from the first adsorber 61 and via conduit 70 introduced into a second adsorber 71 which is constructed and filled in the same way as the first adsorber 61. When the first and the second adsorber are connected in series, the second adsorber serves for the aftertreatment of the first adsorber product stream, whereby a second first adsorber product stream further depleted of hydrogen sulfide and chlorides is obtained, which is discharged from the second adsorber 71 via conduit 72.

Conduit 63 branching off from conduit 60, the valve 64 arranged in the conduit path 63, and further non-illustrated shut-off devices and auxiliary conduits for example serve the connection of a bypass around the first adsorber 61, if revision work, for example an exchange of the contained sorbents, must be carried out on the latter in ongoing operation.

Via conduit 72 the now completely pre-treated mixed feed stream is discharged from the process or the apparatus. It can now be supplied to a steam reforming plant. As due to its origin and pre-treatment the feed stream now contains a significant amount of higher hydrocarbons, it is recommendable to initially subject the same to prereforming by means of which the higher hydrocarbons are split into methane and/or already are partly converted to synthesis gas constituents.

Figure 3:
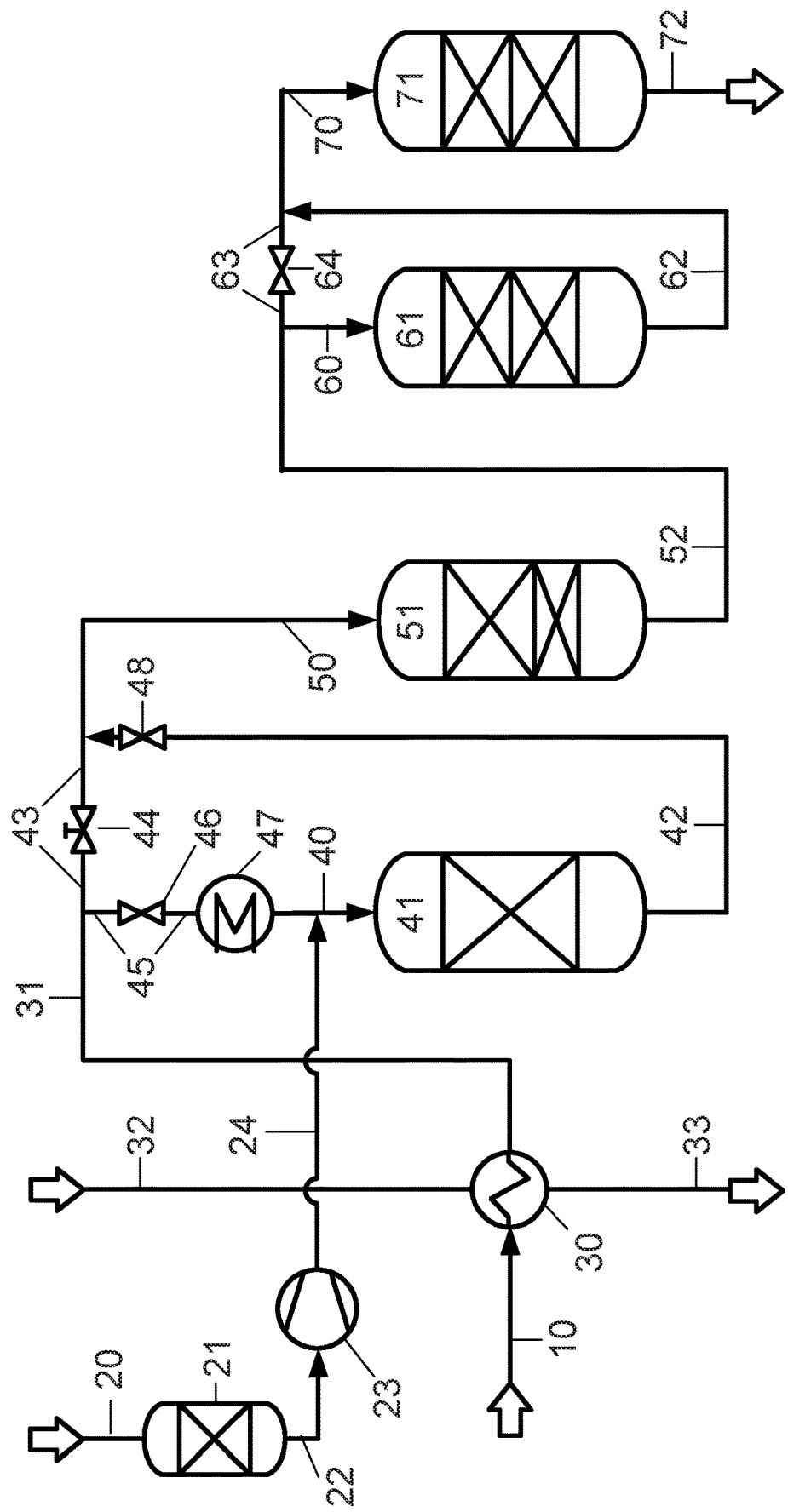
FIG. 3 shows the schematic representation of the process of the invention and the apparatus of the invention according to a second aspect.

In the schematic representation of the process of the invention or the apparatus of the invention according to a second aspect as shown in FIG. 3 identical reference numerals in principle correspond to the process steps and apparatus components as they have been described already in the explanation of the first aspect of the invention, FIG. 1. The respective process conditions, working steps, apparatus components and auxiliary substances also are the same, unless described otherwise in the following.

In contrast to the first aspect the first feed stream (natural gas) now is not combined with the second feed stream (refinery waste gas) before heating in the heat exchanger 30, but is heated alone in the heat exchanger. This has the advantage that the risk of coke deposits in the heat exchanger 30 is reduced considerably, as the concentration of unsaturated compounds in the fluid stream guided in conduit 10 is considerably smaller, often even equal to zero. A bypass around the heat exchanger 30, which is meant to reduce the increase in temperature on heating, therefore can be omitted.

The heated first feed stream leaves the heat exchanger 30 via conduit 31 and is split up into a first and a second hydrogenation partial stream, which are guided on in conduits 45 and 43. The valve 44 now is designed as control valve and along with further, partly non-illustrated control devices serves for setting the mass flows of the two hydrogenation partial streams. Via conduit 45 and a valve 46 arranged in the conduit path 45 the first hydrogenation partial steam is introduced into a cooling device 47 which in the present example is designed as air cooler. The cooled first hydrogenation partial stream is discharged from the cooling device 47 via conduit 40 and now combined and mixed with the second feed stream, which is supplied via conduit 24 after it has first been demetallized and condensed in the way described above.

It is very advantageous that the second feed stream, which contains the olefins and diolefins, is added to the cooled first hydrogenation partial stream and thus is introduced into the process at a relatively cold point. By correspondingly setting the cooling capacity of the cooling device and/or the quantity ratio of the first hydrogenation partial stream to the second hydrogenation partial stream it is ensured that on entry into the diolefin hydrogenation reactor 41 (first hydrogenation zone) the mixture has a temperature of less than 300° C., preferably less than 250° C., most preferably less than 230° C. This measure is very helpful to avoid undesired cracking and polymerization reactions of the olefins and diolefins contained in the mixture. It is particularly advantageous that before the conversion of the diolefins in the first hydrogenation zone the second feed stream no longer gets in contact with heat-exchange surfaces of heat exchangers, for example of the heat exchanger 30. As due to heat transfer limitations said heat exchange surfaces always must be hotter than the desired exit temperature of the fluid stream from the heat exchanger, an increased decomposition of unsaturated hydrocarbons to coke occurs at such heat-exchange surfaces.

Via conduit 40 the mixture formed of the cooled first hydrogenation partial stream and the second feed stream is charged to the diolefin hydrogenation reactor 41 as first hydrogenation reactor, which with regard to its features and its operation corresponds to the above-discussed first aspect of the invention. By corresponding adaptation for example of the cooling capacity of the cooling device, the inlet temperature into the diolefin hydrogenation reactor is set to the optimum value.

Via conduit 42 and the valve 48 located in the conduit path 42 a diolefin hydrogenation product stream depleted of diolefins is discharged from the diolefin hydrogenation reactor and combined with the second hydrogenation partial stream supplied via conduit 43. The mixture thus obtained is guided to the olefin hydrogenation reactor 51 (second hydrogenation zone) via conduit 50. From reference numeral 50 the second aspect corresponds to the first aspect of the invention.

NUMERICAL EXAMPLES

In the following numerical examples the mode of action of the invention is illustrated with reference to the results of simulation calculations. Organic sulfur components are not taken into account here, as for the resulting temperature profiles the hydrogenation of the mono- and diolefins is decisive.

Both examples are based on natural gas as first feed stream and on a refinery waste gas as second feed stream. The compositions of the first and the second feed stream are shown in the columns for conduit 10 and conduit 24 of the material stream table indicated below. All further indications in the material stream table only are applicable for Example 2. The hydrogen content of the refinery waste gas is sufficient for the hydrogenation steps according to the invention, so that the recirculation of hydrogen from the hydrogen product stream of the steam reforming plant can be omitted.

Example 1

According to the first aspect of the invention natural gas as first feed stream is guided to the heat exchanger 30 via conduit 10 at room temperature (25° C.). A refinery waste gas as second feed stream initially is demetallized in the adsorber 21 and subsequently condensed in the condenser 23 and then has a temperature of 81° C. Via conduit 24 the second feed stream is combined with the first feed stream. In the heat exchanger 30 the mixed feed streams are heated such that the temperature in conduit 40 is 260° C. before entry into the diolefin hydrogenation reactor 41. Due to the exothermally proceeding hydrogenation of the diolefins and a part of the olefins, the temperature in conduit 50 before entry into the second hydrogenation stage (reactor 51, olefin hydrogenation+HDS) is about 290° C. Due to the again released reaction enthalpy of the hydrogenation of the olefins and sulfur compounds the temperature at the outlet of the reactor 51 is about 360° C. (conduit 52). With a temperature slightly below this value the gas stream enters into the adsorber 61 via conduit 60, in which adsorber the hydrogen sulfide formed during the hydrodesulfurization is bound to zinc oxide.

In the aspect of the invention as shown in Example 1 it is advantageous that at the inlet of the diolefin hydrogenation reactor 41 and of the olefin hydrogenation or HDS reactor 51 a temperature of 300° C. is not exceeded. The upper limit of 343° C. as defined in U.S. Pat. No. 3,477,832 safely is maintained and the deposition of coke on the hydrogenation catalysts and of adsorbent thus is prevented.

Example 2

The composition and properties of important material streams in conjunction with the following explanation of a second example are shown in the indicated material stream table.

According to the second aspect of the invention natural gas as first feed stream is guided to the heat exchanger 30 via conduit 10 at room temperature (25° C.). In the heat exchanger 30 the natural gas stream is heated without admixing the second feed stream, so that the gas temperature in conduit 31 before branching into conduits 43 and 45 is 368° C. The first hydrogenation partial stream branched off via conduit 45 is introduced into the cooling device 47, cooled there. and via conduit 40 combined with the second feed stream, which is supplied via conduit 24 and has a temperature of 81° C. The mixture obtained then enters into the diolefin hydrogenation reactor 41 with a temperature of 222° C. and leaves said reactor in conduit 42 with a temperature of 229° C. After combining and mixing with the second hydrogenation partial stream (conduit 43) the mixture thus obtained enters into the olefin hydrogenation or HDS reactor 51 with a temperature of 313° C. and leaves the same in conduit 52 with a temperature of 354° C.

Material Stream Table, Example 2, Second Aspect of the Invention

| Conduit No. | 10 | 24 | 31 | 40 | 42 | 50 | 52 |
|---|---|---|---|---|---|---|---|
| Designation | first feed stream (natural gas) | second feed stream (refinery waste gas) | heated first feed stream (natural gas) | Feed - first hydrogenation zone (Diolefin hydr.) | Product - first hydrogenation zone (Diolefin hydr.) | Feed - second hydrogenation zone (olefin hydr. + HDS) | Product - second hydrogenation zone (olefin hydr. + HDS) |
| Molar flow rate (kmol/h) | 1519 | 428 | 1519 | 808 | 805 | 1945 | 1910 |
| Mass flow rate (kg/h) | 27610 | 7605 | 27610 | 14508 | 14508 | 35216 | 35216 |
| Temperature (° C.) | 25 | 81 | 368 | 222 | 229 | 313 | 354 |
| Mole fraction (%) | | | | | | | |
| $H_2$ | 0.00 | 21.20 | 0.02 | 11.24 | 10.91 | 4.53 | 2.67 |
| CO | 0.00 | 1.30 | 0.00 | 0.69 | 0.62 | 0.26 | 0.13 |
| $CO_2$ | 1.07 | 0.10 | 1.07 | 0.56 | 0.56 | 0.86 | 0.87 |
| $H_2O$ | 0.00 | 0.00 | 0.00 | 0.00 | 0.07 | 0.03 | 0.16 |
| $N_2$ | 2.00 | 3.50 | 2.00 | 2.79 | 2.80 | 2.33 | 2.37 |
| $O_2$ | 0.00 | 0.00 | 0.00 | 0.00 | 0.00 | 0.00 | 0.00 |
| Ar | 0.00 | 0.00 | 0.00 | 0.00 | 0.00 | 0.00 | 0.00 |
| Methane | 89.20 | 49.25 | 89.18 | 68.02 | 68.29 | 80.53 | 82.12 |
| Ethane | 5.35 | 15.40 | 5.35 | 10.67 | 10.83 | 7.62 | 8.78 |
| Ethene | 0.00 | 4.80 | 0.00 | 2.54 | 2.42 | 1.00 | 0.00 |
| Ethyne | 0.00 | 0.00 | 0.00 | 0.00 | 0.00 | 0.00 | 0.00 |
| Propane | 1.52 | 1.60 | 1.52 | 1.56 | 1.57 | 1.54 | 1.97 |
| Propene | 0.00 | 1.80 | 0.00 | 0.95 | 0.96 | 0.40 | 0.00 |
| n-Butane | 0.32 | 0.40 | 0.32 | 0.36 | 0.36 | 0.34 | 0.34 |
| i-Butane | 0.26 | 0.00 | 0.26 | 0.12 | 0.12 | 0.20 | 0.33 |
| Butene | 0.00 | 0.50 | 0.00 | 0.26 | 0.29 | 0.12 | 0.00 |
| Butadiene | 0.00 | 0.05 | 0.00 | 0.03 | 0.00 | 0.00 | 0.00 |
| n-Pentane | 0.08 | 0.10 | 0.08 | 0.09 | 0.09 | 0.08 | 0.09 |
| i-Pentane | 0.08 | 0.00 | 0.08 | 0.04 | 0.04 | 0.06 | 0.06 |

All in all, the aspect of the invention explained in Example 2 has the same advantages as explained in conjunction with Example 1. A further advantage consists in that the second feed stream, which contains by far the most part of the olefins and diolefins, is introduced into the process at a relatively cold point and in particular is not heated in the heat exchanger 30 together with the first feed stream. By correspondingly setting the cooling capacity of the cooling device and/or the quantity ratio of the first hydrogenation partial stream to the second hydrogenation partial stream it is ensured that on entry into the diolefin hydrogenation reactor 41 the mixture has the desired temperature of below 230° C.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

INDUSTRIAL APPLICABILITY

The invention provides a process and an apparatus for producing a mixed feed stream for a steam reforming plant. As feed streams natural gas and higher hydrocarbon streams can be used, which include a significant amount of unsaturated hydrocarbons and organic sulfur compounds. Due to the stepwise hydrogenation according to the invention and the optimized temperature profile overheating of the feedstocks is avoided, which leads to thermal cracking in particular of the contained unsaturated hydrocarbons, to undesired coke deposits and thus to cloggings of the apparatus and downstream systems and to the accelerated deactivation of the catalysts used. The availability of the plant and therefore the economy of the downstream steam reforming plant thereby is increased.

LIST OF REFERENCE NUMERALS 10 conduit
20 conduit
21 adsorber (demetallization)
22 conduit
23 condenser
24 conduit
30 heat exchanger
31 conduit
32 conduit
33 conduit
34 conduit
35 valve
40 conduit
41 diolefin hydrogenation reactor (first hydrogenation zone)
42 conduit
43 conduit
44 valve
45 conduit
46 valve
47 cooling device
48 conduit
50 conduit
51 olefin hydrogenation+HDS reactor (second+third hydrogenation zones)
52 conduit
60 conduit
61 adsorber
62 conduit
63 conduit
64 valve
70 conduit
71 adsorber
72 conduit

The invention claimed is:

1. A process for producing a mixed feed stream for a steam reforming plant containing at least one reforming stage, the mixed feed stream comprising a first feed stream containing methane and a second feed stream comprising higher hydrocarbons, olefins and diolefins, wherein the first and/or the second feed stream also contains sulfur compounds, and wherein the process comprises the following steps:
    a) providing the first feed stream and the second feed stream;
    b) heating the first feed stream in a first heating device;
    c) combining and mixing at least a part of the first feed stream with the second feed stream, introducing this mixture into a first hydrogenation zone, at least partly converting the diolefins in the first hydrogenation zone under diolefin hydrogenation conditions, discharging a diolefin hydrogenation product stream from the first hydrogenation zone;
    d) introducing the diolefin hydrogenation product stream into a second hydrogenation zone, at least partly converting the olefins in the second hydrogenation zone under olefin hydrogenation conditions, discharging an olefin hydrogenation product stream from the second hydrogenation zone;
    e) introducing the olefin hydrogenation product stream into a third hydrogenation zone, at least partly converting the sulfur compounds in the third hydrogenation zone under conditions of the hydrodesulfurization (HDS) to desulfurized hydrocarbons and hydrogen sulfide, discharging an HDS product stream from the third hydrogenation zone;
    f) introducing the HDS product stream into at least one adsorption zone, filled with an adsorbent selective for hydrogen sulfide, at least partly separating the hydrogen sulfide by adsorption on the adsorbent, discharging an adsorber product stream depleted of hydrogen sulfide from the adsorption zone; and
    g) introducing the adsorber product stream as mixed feed stream into at least one reforming stage,
    wherein:
        i. after heating in the first heating device, the first feed stream is split up into a first hydrogenation partial stream and a second hydrogenation partial system, ii. the first hydrogenation partial stream is introduced into a cooling device,
iii. a cooled first hydrogenation partial stream is discharged from the cooling device,
iv. the cooled first hydrogenation partial system is combined and mixed with the second feed stream,
v. the mixture thus obtained is introduced into the first hydrogenation zone.

2. The process according to claim 1, wherein combining and mixing of at least a part of the first feed stream with the second feed stream is effected such that on entry into the first hydrogenation zone the mixture has a temperature of less than 300° C.

3. The process according to claim 1, wherein the diolefin hydrogenation product stream is combined and mixed with the second hydrogenation partial stream and the mixture thus obtained is introduced into the second hydrogenation zone.

4. The process according to claim 1, wherein an air cooler or a heat exchanger is used as cooling device, wherein in use of a heat exchanger cooling preferably is effected by indirect heat exchange against at least a part of the first feed stream before the first heating device.

5. The process according to claim 1, wherein the cooling capacity of the cooling device and/or the quantity ratio of the first hydrogenation partial stream to the second hydrogenation partial stream is chosen such that on entry into the first hydrogenation zone the mixture has a temperature of less than 300° C.

6. The process according to claim 1, wherein prior to combining and mixing with at least a part of the first feed stream the second feed stream is introduced into an adsorption zone which is filled with an adsorbent selective for metals.

7. The process according to claim 1, wherein the first heating device is designed as heat exchanger, wherein the first feed stream is heated by indirect heat exchange against a hot raw synthesis gas product stream from the steam reforming plant, against a hot flue gas stream from the reformer furnace or against a hot product gas stream from the CO conversion plant (CO shift) downstream of the stream reforming plant.

8. The process according to claim 1, wherein the steam reforming plant comprises a pre-reforming stage in which higher hydrocarbons are at least partly converted to methane under pre-reforming conditions.

* * * * *